United States Patent [19]
Anders et al.

[11] Patent Number: 5,808,395
[45] Date of Patent: Sep. 15, 1998

[54] TORQUE MOTOR

[75] Inventors: Markus Anders, Schöneck; Egon Christian Andresen, Mühltal; Hans-Jürgen Kärcher, Karben, all of Germany

[73] Assignee: MAN Gutehoffnungshütte Aktiengesellschaft, Oberhausen, Germany

[21] Appl. No.: 560,048

[22] Filed: Nov. 17, 1995

[30] Foreign Application Priority Data

Nov. 19, 1994 [DE] Germany .................. 44 41 208.8

[51] Int. Cl.⁶ .............. H02K 1/22; H02K 7/06; H02K 11/00
[52] U.S. Cl. .................. 310/266; 310/80; 310/68 R
[58] Field of Search ............ 310/266, 80, 261, 310/254, 68 R, 179

[56] References Cited

U.S. PATENT DOCUMENTS

| | | | |
|---|---|---|---|
| 3,641,376 | 2/1972 | Livingston | 310/113 |
| 3,736,449 | 5/1973 | Honeywell | 310/171 |
| 4,099,077 | 7/1978 | Maekawa | 310/237 |
| 4,185,215 | 1/1980 | Montagu | 310/83 |
| 4,349,761 | 9/1982 | Aoki | 310/266 |
| 4,491,753 | 1/1985 | Kumatani | 310/77 |
| 4,494,028 | 1/1985 | Brown | 310/156 |
| 4,529,900 | 7/1985 | Uzaka | 310/43 |
| 4,533,848 | 8/1985 | Nakamura | 310/237 |
| 4,538,083 | 8/1985 | Nozawa | 310/198 |

Primary Examiner—Steven L. Stephen
Assistant Examiner—Michael J. Wallace, Jr.
Attorney, Agent, or Firm—Max Fogiel

[57] ABSTRACT

The present invention concerns a motor for generating torques around more than one axis with respect to an object that can be rotated and revolved around only one point. Only one mechanism is necessary to maintain a prescribed position or to produce changes in position around one or more axes (X, Y, or Z).

The permanent-magnet excited synchronous machine comprises stator shells (10 & 10.1), multiple-phase windings (11 & 11.1), and a rotor (12) with permanent magnets (13 & 13.1), whereby the annular and spherical surfaces (14) of the rotor are more extensive than the annular and spherical surfaces (15) of the shells.

All the spherical surfaces share the same center (M) of curvature, which simultaneously constitutes the origin of the coordinate systems, and the center of rotation. The shaft (17) is supported only at the center of curvature and such as to ensure freedom of motion throughout the reference coordinate system (21).

23 Claims, 4 Drawing Sheets

TORQUE MOTOR

BACKGROUND OF THE INVENTION

The present invention concerns a torque motor that can generate torque around more than one axis.

Various applications require a drive system that can revolve or move an object around more than one axis along a particular path or maintain it in a particular position.

Controls-technology methods of electromechanically revolving appropriately mounted articles around several axes and maintaining them in position are known from O. F öllinger, *Regelungstechnik,* 8th edition, Heidelberg, H üthig, 1994 and from R. Schönfeld, *Digitale Regelung elektrischer Antreibe,* 2nd edition, revised, Berlin, Technik, 1990. A separate drive system is usually employed for each axis that a motion is to be carried out around.

Each drive system is mechanically coupled to the object that is to be controlled and must be separately actuated. There are drawbacks to this approach in the need for so many drive systems and, when engineering dictates long driveshafts, in the elasticity of the coupling between the motor and the object being positioned. The axes are separated mechanically in n-fold single-axis embodiments (wherein n is the number of axes that are to be rotated around e.g. cartesian coordinate system: 3-axes).

A spherical-shaped motor is known from French Exposure 2 452 193. It operates in accordance with the principle of asynchronous machinery, with that of reluctance machinery, or with a combination of both. According to the major claim, the French invention concerns a spherical motor that directly drives a ball-and-socket joint around a center of rotation. This torque motor is, in order to carry out motions around three axes, separated into four equal sectors. The sectors are obvious from the stator. Each accommodates the requisite windings.

There is a drawback in the way that motion around two perpendicular axes requires two perpendicular winding systems.

Torque motors in the shape of a sphere and with a spherical air gap are also known from E. R. Laithwaite, *Induction Machines for Special Purposes,* London, George Newnes, 1966.

SUMMARY OF THE INVENTION

The object of the present invention is a device that lacks the aforesaid drawbacks encountered at the state of the art employing separate drive systems and perpendicular windings, that includes as few as possible mechanical components, and that features simpler electronic controls with no sacrifice of positioning precision.

Only one drive system with only one winding, divided into several segments, is accordingly necessary to generate motion around one or more axes, the three axes of the cartesian coordinate system for example, and to maintain a prescribed position.

The present invention is demarcated from the invention disclosed in French Exposure 2 452 193 by the type of machinery employed in the motor in accordance with the present invention. It is a synchronous motor.

The rotor, furthermore, is directly mechanically coupled to the object being positioned. This coupling is without elastic intermediate links. The result is a direct drive system, in which all the unnecessary mechanical components along with their drawbacks are eliminated.

It is part of the concept behind the present invention that the rotor yoke of the torque motor's with the surface-mounted permanent magnets or the equivalent electric excitation and the stator yoke with the armature windings are not off the conventional cylindrical shape or in a special disk-shaped rotor machinery form but exhibit a spherical and annular, geometry or in other words a spherical cup geometry. The common center is simultaneously the center of the bearing and the center of rotation.

Although rotation around the longitudinal axis of the object being positioned is possible, rotation around the other two axes is restricted to a range of angles by the principle governing the motor's function and by the potential design.

The axes of the reference coordinate system are separated electrical plane in this system.

Technically, each moment of position maintenance is produced from one or more forces generated by one or more direct currents and the (permanent-magnet or direct-current excitation), and each moment of acceleration for one motion is generated by alternating currents or currents that vary over time. The multiple-phase winding segments are supplied with current from four parallel multiple-phase power inverter that have access to a common power rectifier with an intermediate-circuit capacitor. The general control procedure is based on a prescribed directional vector $r_{soll}$, on an empirically determined actual directional vector $r_{ist}$, and on the deviation $\delta r$ constructed from the difference between them. The master position controller construct from this deviation a signal $\delta R$ that is separated into the orthogonal spatial components and transformed into a machine-specific coordinate system $R_{soll\ I}$, $R_{soll\ II}$, $R_{soll\ III}$, and $R_{soll\ IV}$. Depending on the depth of the cascade of the employed control system, further inner control loops are integrated to build the output signals for the power inverters and, in conjunction with the machinery in accordance with the present invention, vary the position of the object and accordingly directly affect the actual vector $r_{ist}$.

An alternative version of the present invention reduces the double sided motor to a single sided motor (one stator and rotor arrangement). But now axial stress does occur in the bearing, however, and the motor is then only able to achieve approximately half the torque.

In another version it is possible to change the arrangement of stator and rotor in the way that the spherical stator with the multiple-phase windings on a supporting structure is moved between the spherical rotor yokes with the surface-mounted permanent magnets or an equivalent electric excitation with a common center.

BRIEF DESCRIPTION OF THE DRAWINGS

One embodiment of the present invention will now be specified by way of example with reference to a schematic drawing, wherein.

DESCRIPTION OF THE PREFERRED EMBODIMENTS

Figure 1:
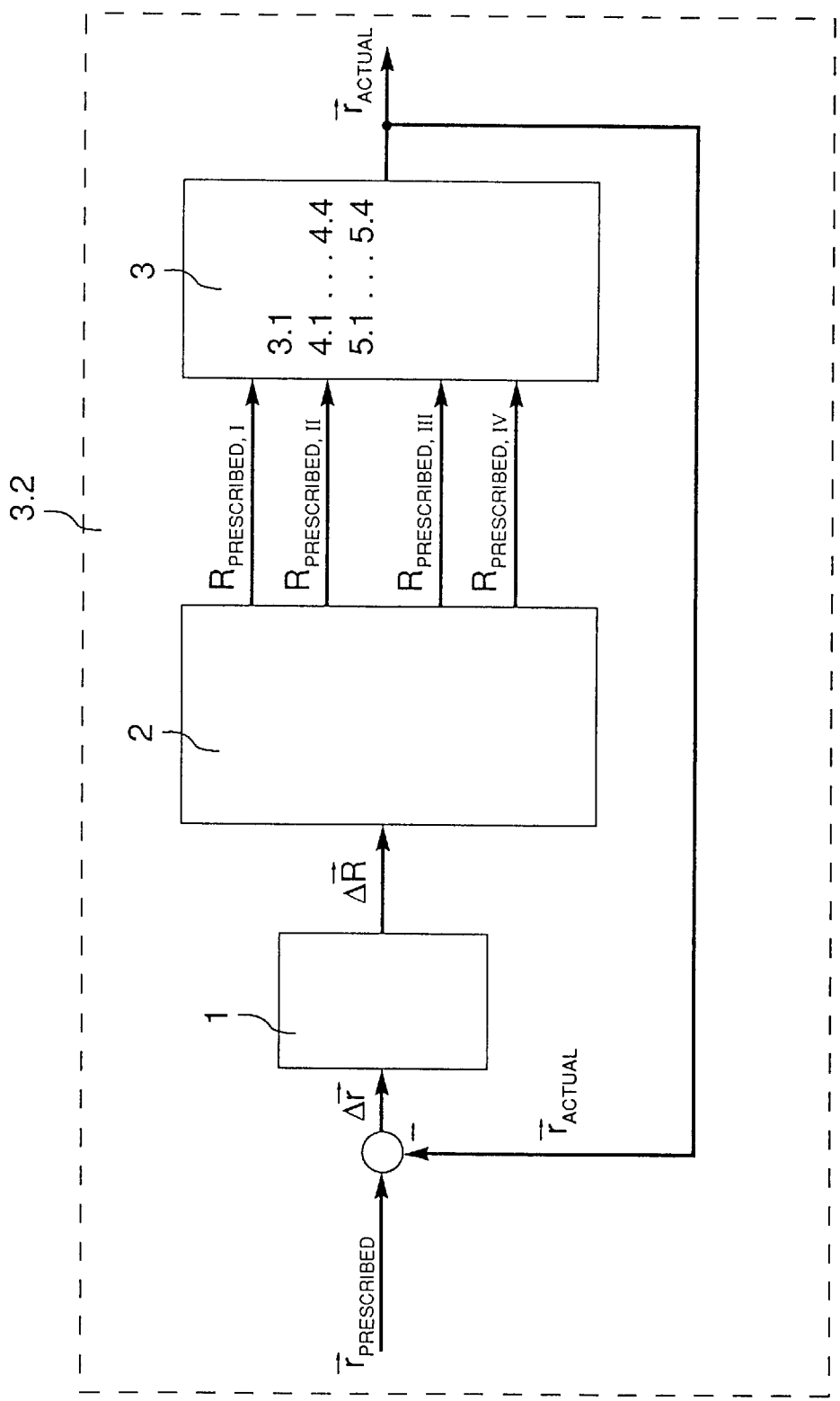
FIG. 1 is a simplified block diagram of the open loop control or the control system.

FIG. 1 is a schematic block diagram illustrating the control system of a torque motor.

The master position controller 1 generates from the system deviation δr a signal δR for a directly downstream coordinate transformer 2. The coordinate transformer 2 forms machine-specific signals. When there are four segments, these signals are $R_{soll\,I}$, $R_{soll\,II}$, $R_{soll\,III}$, and $R_{soll\,IV}$. These signals represent the input parameters for the inner control loops 3.1. The output signals from the most inner control loop generates the signals for the multiple-phase power inverters 4.1 to 4.4 with the winding segments 5.1 to 5.4.

Figure 2:
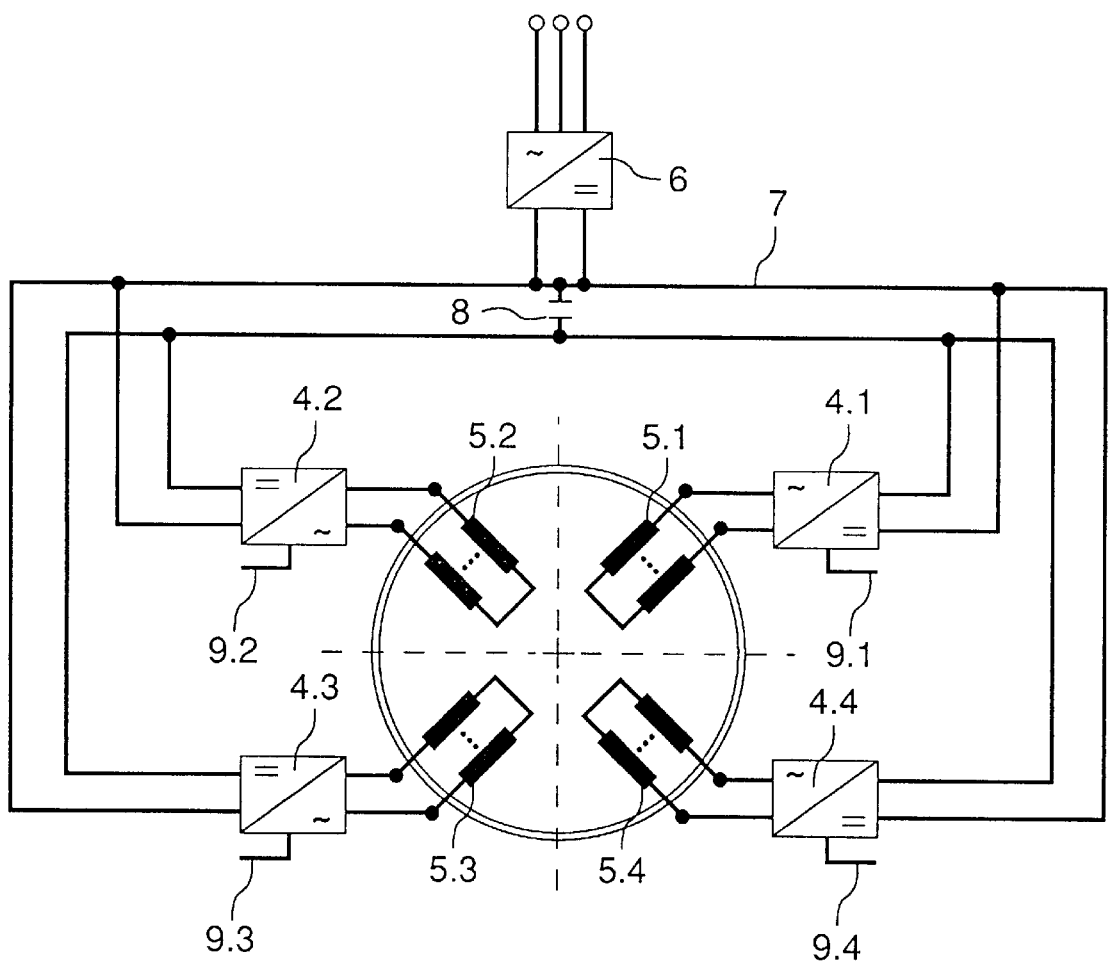
FIG. 2 illustrates the principle employed in controlling a synchronous torque machine excited by permanent magnets, in an exemplary embodiment with a division in four independent electrical circuits.

FIG. 2 illustrates the principle employed to control the motor. A power rectifier 6 is connected to an alternating-current intermediate circuit 7 with a capacitor 8. As an example, the four parallel multiple-phase power inverter units 4.1 to 4.4 and multiple-phase winding segments 5.1 to 5.4 are connected hereto. Each inverter can be supplied with independent control signals over a separate control wire 9.1 to 9.4.

Figure 3:
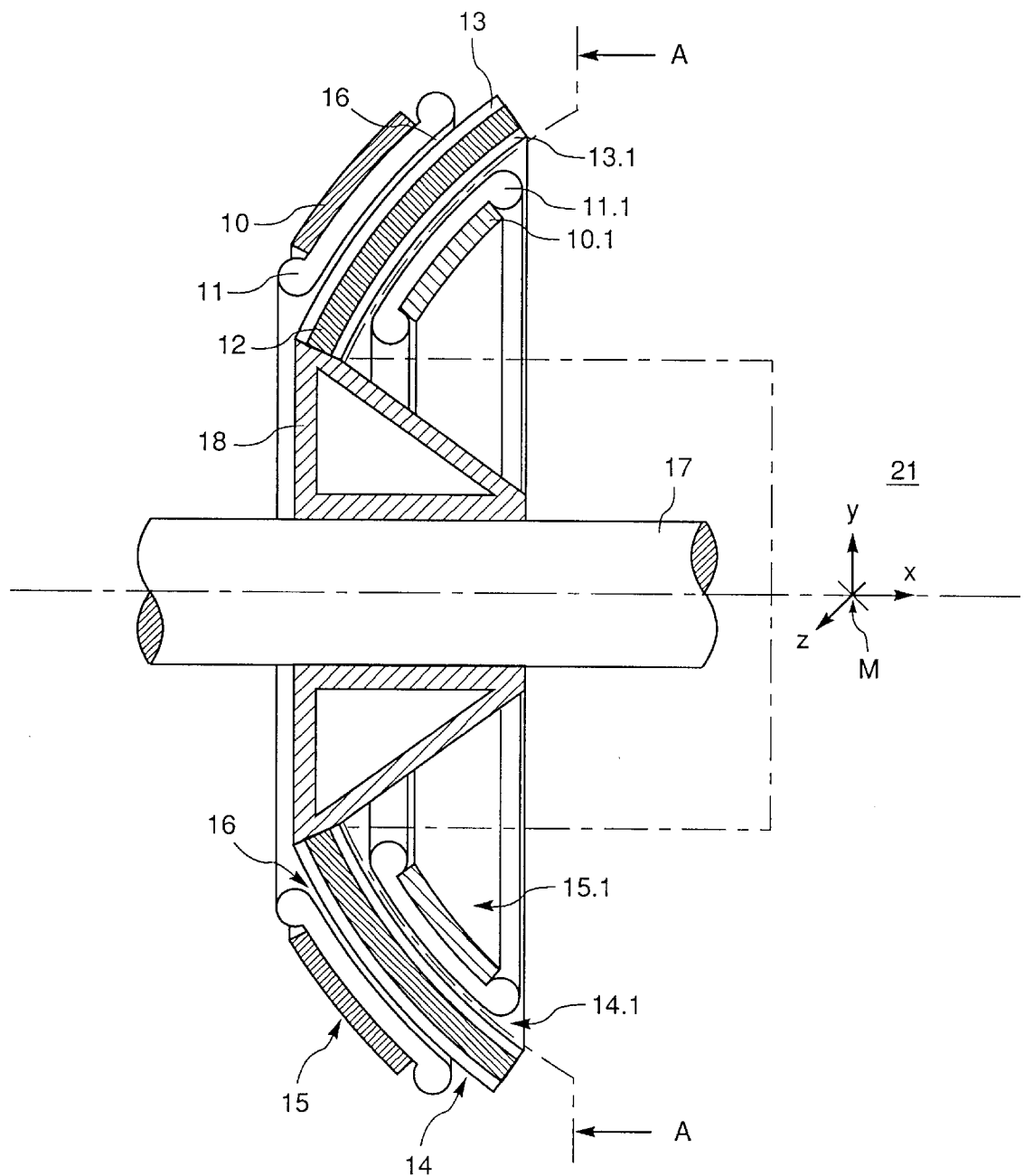
FIG. 3 is a section through a permanent-magnet excited synchronous torque machine.

FIG. 3 is a section through a torque motor. Two stator yokes 10 and 10.1 with the multiple-phase windings 11 and 11.1 accommodate a rotor yoke 12 with surface mounted permanent magnets 13 and 13.1 between them. The annular and spherical surface 14 of rotor 12 with surface mounted permanent and 13.1 is more extensive than the annular and spherical surfaces 15 and 15.1 of the stator yokes 10 and 10.1 and windings 11 and 11.1. This feature allows the winding conductors to always extend independent of the rotor position in the permanent magnets' almost homogeneous field.

The annular and spherical surfaces 14 of rotor 12 could alternatively be less extensive than the annular and spherical surfaces 15 and 15.1 of stator yokes 10 and 10.1, in which event the permanent-magnetic field would be accommodated inside multiple-phase windings 11 and 11.1.

Surfaces 14 and 15 have a common center M of curvature that simultaneously constitutes the origin of the coordinates and the center of rotation. Shaft 17 is attached only at center M of rotation and specifically such as to ensure motion in all three dimension of reference coordinate system 21. The overall bearing is adapted to this purpose. Rotor 12 is fastened tight to shaft 17 along with surface-mounted magnets 13 and 13.1 by a supporting structure 18.

Figure 4:
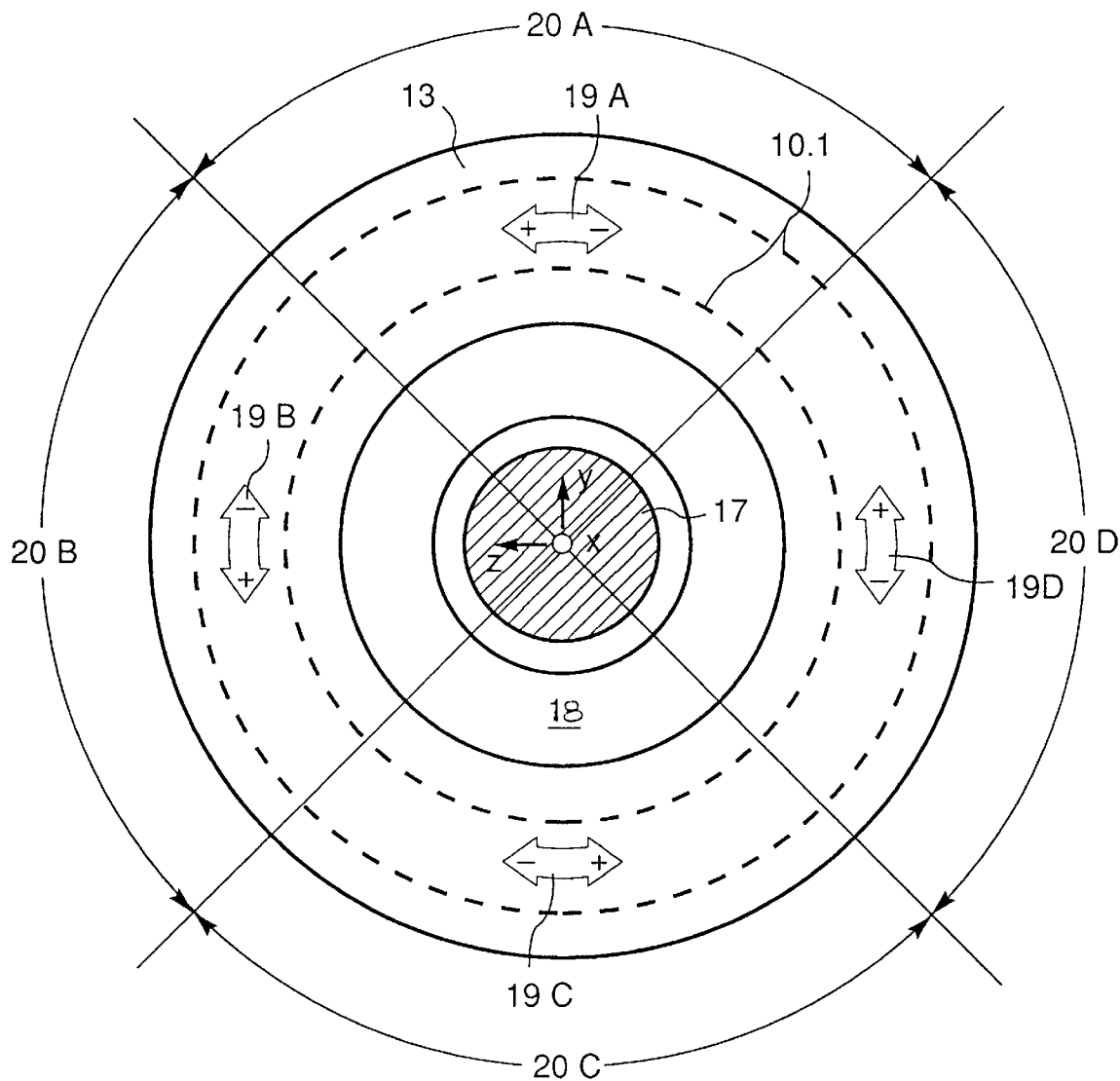
FIG. 4 is a section along the line A—A through a permanent-magnet excited synchronous machine with four segments.

FIG. 4 is a section along the line A—A in FIG. 3 looking toward rotor 12 and surface-mounted permanent magnets 13 and 13.1. Holding or accelerating force vectors 19A to 19D are indicated in the four segment areas 20A to 20D. Counterclockwise forces are indicated by a "−" and clockwise forces by a "+".

Rotation or motion around the X axis of the reference coordinate system is attained when at least one of the force vectors 19A to 19D in segment areas 20A to 20D points either clockwise or counterclockwise, depending on the desired direction. When more than one force vector is employed, all of them must point in the same direction, clockwise or counterclockwise.

When the force vectors 19A and 19C in segment areas 20A and 20B point in opposite directions, vector 19A clockwise and vector 19C counterclockwise or vector 19A counterclockwise and vector 19C clockwise for example, they will generate torque around the Y axis.

The force vectors 19B and 19D in segment areas 20B and 20C constitute the basis for constructing torque around the Z axis when force vector 19B is clockwise and force vector 19D counterclockwise or force vector 19B counterclockwise and force vector 19D clockwise.

In a motor with four segment areas 20A to 20D, simultaneous rotation or motion around all the axes in reference coordinate system 21 can be attained by superposing the separate rotations around the X, Y, and Z axes in proportion to the sum of force vectors 19A to 19D to obtain a rotation around center M that will revolve or move an object or device along a particular path and into a particular position and maintain it there. That position must be within a region mechanically or operationally dictated by the geometrical dimensions of the device or mechanism.

The method of constructing forces or torques described with reference to FIG. 4 through the example of four segments can be expanded to any number of segments. Of all the segments $N_{GS}$, the winding segments with the number $N_{WS}$ must as will be evident from the present embodiment be actuated to generate a motion around the desired axis. There must for reasons of process technology be at least three segments. The maximal number of segments is dictated by the engineering and financial expenditure incurred for each additional segment (power inverters, actuation, and control loops).

One preferred field of application for the present invention is the positioning of terrestrial telescopes and of telescopes in airplane observatories. The device can also be employed to absorb vibrations as well as for positioning. Such vibrations result from turbulent winds in the vicinity of the ground or in open telescope cabins.

Another field of application for the present invention is for stirring and kneading machinery, which features constant rotation around the machine's longitudinal axis (the X axis in the reference coordinate system) and swinging motions around the associated transverse axes (the Y and Z axes).

It is also possible to reverse the principle behind the present invention. The resulting device will be a tachometer generator that induces voltages in the winding segments as the rotor moves or rotates. Such a device can accordingly be employed as a multidimensional signal generator.

We claim:

1. A synchronous torque motor comprising: spherical cup-shaped stator yokes having multiple-phase windings mounted on said stator yokes; a spherical cup-shaped rotor with surface-mounted permanent magnets mounted on said rotor, said rotor with said permanent magnets being located between said stator yokes with said multiple-phase windings; support means securing said rotor to a rotatable shaft, said cup-shaped stator yokes and said cup-shaped rotor having a common center of curvature; at least three divided segment areas having winding segments for each stator, multiple-phase power inverters, each of said power inverters being connected to one of said winding segments, and secondary control loops connected to said power inverters for generating torques about three coordinate axes with only a single uniformly divided multiple-phase winding for each stator at a periphery of the motor by actuating said winding segments; said rotor with said permanent magnets being mounted opposite a stator yoke with a multiple-phase winding; said multiple-phase windings being slotted; said stator yokes being laminated; each winding segment in said segment areas being supplied with electricity by a separate one of said power inverters; each power inverter having its own control line, said power inverter being controllable through said control line; said power inverter being controllable in combination with other power inverters; a coordinate transformer in a position control loop having a position controller, said winding segments being controllable by said power inverters and said coordinate transformer.

2. A synchronous torque motor comprising: spherical cup-shaped stator yokes having multiple-phase windings mounted on said stator yokes; a spherical cup-shaped rotor with surface-mounted permanent magnets mounted on said rotor, said rotor with said permanent magnets being located between said stator yokes with said multiple-phase windings; support means securing said rotor to a rotatable shaft, said cup-shaped stator yokes and said cup-shaped rotor having a common center of curvature; at least three separate multiple-phase winding segments for each stator, three multiple-phase power inverters, each of said three multiple-phase power inverters being connected to one of said three multiple-phase winding segments, and three inner control loops connected to said three power inverters for generating torques about three perpendicular coordinate axes, separation of said multiple-phase windings being electrically to comprise at least three equal electrical circuits.

3. A torque motor as defined in claim 2, wherein said rotor with said surface-mounted permanent magnets are mounted opposite a stator yoke with a multiple-phase winding.

4. A torque motor as defined in claim 2, wherein said multiple-phase windings are slotted.

5. A torque motor as defined in claim 2, wherein said stator yokes are laminated.

6. A torque motor as defined in claim 2, wherein said stator yokes are ferromagnetic solid masses.

7. A torque motor as defined in claim 2, wherein each winding segment in said segment areas is supplied with electricity by a separate one of said power inverters.

8. A torque motor as defined in claim 2, wherein each power inverter has its own control line, said power inverter being controllable through said control line.

9. A torque motor as defined in claim 2, wherein said power inverter is controllable individually.

10. A torque motor as defined in claim 2, wherein said power inverter is controllable in combination with other power inverters.

11. A torque motor as defined in claim 2, including a coordinate transformer in a position control loop having a position controller; said winding segments being controllable by said power inverters and said coordinate transformer.

12. An arrangement for generating torques as defined in claim 2, including means for operating in reverse as a tachometer to generate control signals.

13. A synchronous torque motor comprising: spherical cup-shaped stator yokes having multiple-phase windings mounted on said stator yokes; a spherical cup-shaped rotor with electrical excitation mounted on said rotor, said rotor with said electrical excitation being located between said stator yokes with said multiple-phase windings; support means securing said rotor to a rotatable shaft, said cup-shaped stator yokes and said cup-shaped rotor having a common center of curvature; at least three separate multiple-phase winding segments for each stator, three multiple-phase power inverters, each of said three multiple-phase power inverters being connected to one of said three multiple-phase winding segments, and three inner control loops connected to said three power inverters for generating torques about three perpendicular coordinate axes, separation of said multiple-phase windings being electrically to comprise at least three equal electrical circuits.

14. A torque motor as defined in claim 13, wherein said rotor with said permanent magnets are mounted opposite a stator yoke with a multiple-phase winding.

15. A torque motor as defined in claim 13, wherein said multiple-phase windings are slotted.

16. A torque motor as defined in claim 13, wherein said stator yokes are laminated.

17. A torque motor as defined in claim 13, wherein said stator yokes are ferromagnetic solid masses.

18. A torque motor as defined in claim 13, wherein each winding segment in said segment areas is supplied with electricity by a separate one of said power inverters.

19. A torque motor as defined in claim 13, wherein each power inverter has its own control line, said power inverter being controllable through said control line.

20. A torque motor as defined in claim 13, wherein said power inverter is controllable individually.

21. A torque motor as defined in claim 13, wherein said power inverter is controllable in combination with other power inverters.

22. A torque motor as defined in claim 13, including a coordinate transformer in a position control loop having a position controller; said winding segments being controllable by said power inverters and said coordinate transformer.

23. An arrangement for generating torques as defined in claim 13, including means for operating in reverse as a tachometer to generate control signals.

* * * * *